Sept. 13, 1960  W. L. McCLURE  2,952,621
PROCESS AND APPARATUS FOR CONVERTING HYDROCARBONS
Filed March 7, 1958  2 Sheets-Sheet 1

INVENTOR.
WILLIAM L. MC CLURE
BY Robert D. Spindle
ATTORNEY

INVENTOR.
WILLIAM L. MC CLURE

BY Robert O. Spindle

ATTORNEY

United States Patent Office 2,952,621
Patented Sept. 13, 1960

2,952,621
PROCESS AND APPARATUS FOR CONVERTING HYDROCARBONS

William L. McClure, Toledo, Ohio, assignor to Sun Oil Company, Philadelphia, Pa., a corporation of New Jersey Filed Mar. 7, 1958, Ser. No. 719,936

12 Claims. (Cl. 208—166)

This invention relates to a process and apparatus for converting hydrocarbons, and more particularly to a method and means for controlling the rate of flow of granular solid conversion-supporting material in a conversion vessel.

It is known in the art to contact hydrocarbon charge stocks such as various petroleum fractions with a compact moving bed of granular solid conversion-supporting material, e.g. silica-alumina catalyst, inert heat transfer material, etc., in order to effect conversion of the charge stock. Such processes are well known in the field of cracking of higher molecular weight charge stocks to produce lower molecular weight products such as gasoline, and also in other known processes for hydrocarbon conversion.

In processes where the charge stock is introduced in liquid phase into the conversion zone, it is necessary to provide special means to obtain good contact of the liquid with the granular solids, and good distribution of the liquid throughout the moving bed of solids. In order to promote good contact and distribution, it is known to provide an annular curtain of freely falling solids, into which oil droplets are discharged from a central location. In this process the oil and solids fall to the bottom of the conversion vessel, where they form a compact bed. The bottom of the conversion vessel is in the shape of an inverted cone, having an outlet extending downwardly from its center, so that the solids gravitate therethrough. The granular solids introduced into the conversion vessel are at a conversion supporting temperature as known in the art, and a portion of the liquid hydrocarbon charge is vaporized on contact with the solids. The evolved vapors are passed downwardly concurrently with the solids gravitating through the lower portion of the conversion vessel, and undergo further conversion during such passage. Additional portions of the liquids on the solids are vaporized during passage of the solids through the conical portion of the conversion vessel, and the vaporous conversion products are disengaged by suitable means known in the art, and removed for further processing. The unvaporized liquid on the solid particles is converted to coke, and the solids containing coke deposits are withdrawn through the conduit at the bottom of the conversion vessel, regenerated by burning off the coke, and returned to the top of the conversion vessel.

The amount and type of conversion of the hydrocarbons accomplished by such a process is in part determined by the amount of exposure of the hydrocarbon to the granular solids. This amount of exposure is to a large extent determined by the rate of flow of the solids into the conversion zone, which in turn affects the depth of the compact mass at the bottom of the conversion vessel, and the length of time required for a particular particle to gravitate through the bed and into the outlet.

It is therefore an object of this invention to provide a method by which the exposure time of the hydrocarbon to the solids may be closely regulated. It is another object to provide an apparatus by means of which the rate of flow of solids through the conversion vessel may be controlled.

These and other objects, which will become more apparent hereinafter, are achieved by directing a stream of an inert gas countercurrently to the flow of the solid material whereby the flow of solid material is conveniently varied by varying the flow of the inert gas.

For a better understanding of the invention, reference is made to the accompanying drawings, wherein Figure 1 is a sectional elevational view of a conversion vessel according to the invention, and Figure 2 is an enlarged sectional elevational view of the solids feed controlling means according to this invention.

Figure 1:
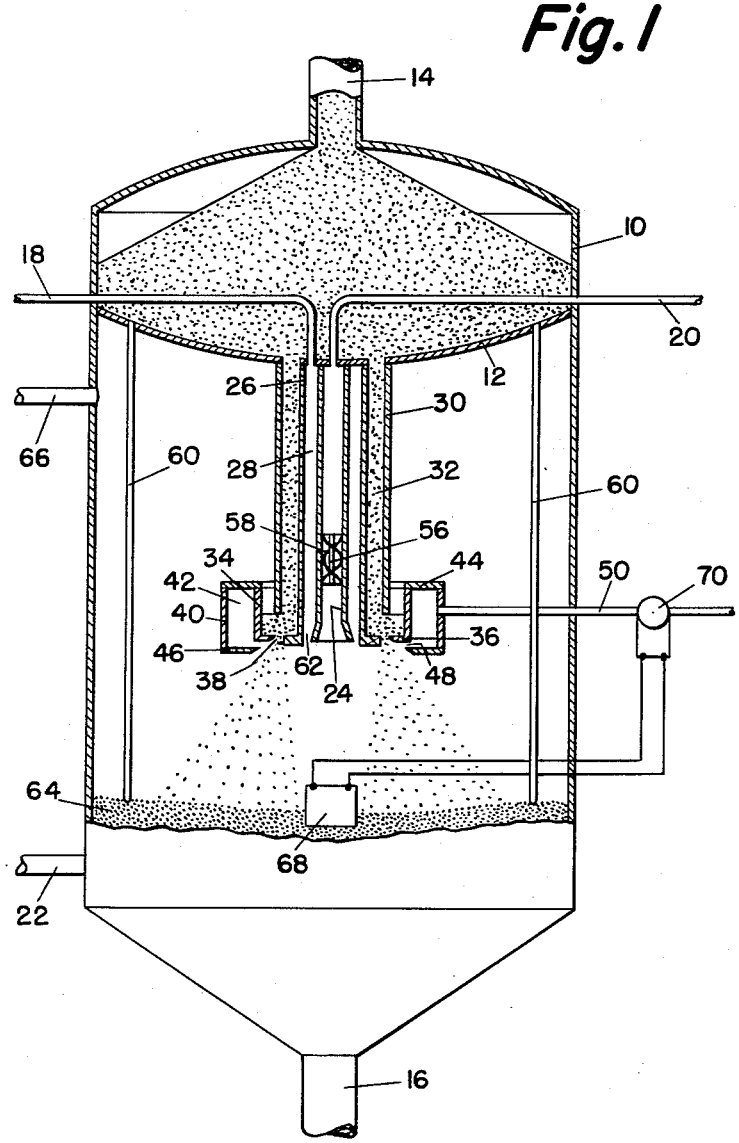

Referring to Figure 1, cylindrical vessel 10 has a transverse partition 12 therewithin, an upper inlet 14 for granular solids, a lower outlet 16 for granular solids, an inlet conduit 18 for inert fluid, an inlet conduit 20 for liquid hydrocarbon charge, and an outlet conduit 22 for vaporous conversion products. Within vessel 10 and beneath partition 12 is a downwardly extending cylindrical conduit 24. Surrounding a portion of conduit 24 is a cylindrical sleeve 26 providing a first annular passageway 28 between sleeve 26 and conduit 24. Surrounding a portion of sleeve 26 is a second cylindrical sleeve 30, providing a second annular passageway 32 between sleeves 30 and 26. Surrounding a portion of sleeve 30 is a third cylindrical sleeve 34. Annular closure member 36 communicates with the lower ends of sleeves 26 and 30 and has an annular aperture 38 therewithin. Surrounding a portion of sleeve 34 is a fourth cylindrical sleeve 40, providing a third annular passageway 42 between sleeves 34 and 40, as more clearly seen in Figure 2. The top of annular passageway 42 is closed by annular closure member 44, and the bottom of annular passageway 42 is closed by annular closure member 46, which is positioned below and spaced away from annular member 36 so as to form an annular aperture 48 therebetween. Inert fluid conduit 50 leads into passageway 42. Annular closure member 36 is relieved at 52, and annular closure member 46 is relieved at 54. These two relieved portions together with aperture 48 provide means for directing flow of inert fluid countercurrently to the flow of solids.

The relief may take the form of a rounded edge, as shown at 52, or a chamfered edge, as shown at 54. A line 53 drawn tangent to 52 and 54 is preferably at an angle 55 or greater than 60° with the vertical, in order to avoid possible clogging of aperture 48 by the falling solids.

Within conduit 24 is a concentric solid cylindrical member 56, to which are secured helical baffle means 58, the outer edges of which are in contact with or secured to the inner wall of conduit 24. A plurality of downcomers 60, of which only two are shown in the drawing, have their upper ends secured within apertures in transverse partition 12.

In operation, granular solids are introduced through inlet 14 and gravitate as a compact mass through an upper portion of conversion vessel 10. Inert sealing gas, e.g. steam, is introduced into this upper portion through means not shown, such introduction being conventional. Portions of the granular solids are gravitated through the downcomers 60 into a lower portion of conversion vessel

10. Another portion of the solids is gravitated through the outer annular passageway 32, and pass through the aperture 38, beneath which the solids fall freely in an annular curtain, forming a compact bed 64, from which solids are drawn off through lower outlet 16.

Hydrocarbon cracking charge in liquid phase, which may if desired be mixed with an inert fluid such as steam, with vapor phase hydrocarbon cracking charge, or with both inert fluid and vapor phase cracking charge, is introduced through line 20 into the upper end of conduit 24, and passes downwardly through conduit 24 with rotary motion imparted thereto by the helical baffle means 58. The charge then passes into the lower portion of conversion vessel 10, the rotary motion of the hydrocarbon charge causing it to move laterally as well as downwardly while passing through this lower portion.

Inert fluid such as steam is introduced through line 18, into annular passageway 28, and passes downwardly through passageway 62 into the space therebeneath. The purpose of the steam is to protect metal surfaces from accumulation of excessive coke resulting from impingement and coking of oil droplets thereon. The use of such steam is not essential in all instances, however. As the steam and liquid hydrocarbon charge pass downwardly beneath the lower end of conduit 24, they are commingled and travel laterally and downwardly into contact with the falling solids.

The granular solids introduced into vessel 10 are at a conversion-supporting temperature as known in the art, and a portion of the liquid hydrocarbon charge is vaporized upon contact with the solids. The evolved vapors are passed downwardly concurrently with the solids gravitating through the lower portion of vessel 10, and undergo further conversion during such passage. Additional portions of the liquid on the solids are vaporized during passage of solids through the lower portion of vessel 10, and the vaporous conversion products are disengaged by suitable means not shown and removed through line 22 for further processing as well known in the art. The unvaporized liquid on the solid particles is converted to coke, and the solids containing coke deposits are withdrawn through line 16, for regeneration by conventional means not shown. In the regeneration process, the coke deposits are burned from the solid particles, and the regenerated particles are elevated to a level above vessel 10 and introduced again through line 14 to affect further conversion of hydrocarbon charge.

An inert fluid, such as steam, is introduced through conduit 50 into passageway 42. This fluid is then forced through annular aperture 48 into the path of the annular curtain of solids falling through aperture 38. Due to the relieved portions 52 and 54, the inert fluid moves both upwardly and inwardly. Thus the relieved portions provide means for directing the inert fluid countercurrently to the flow of the solids. Such relieved portions are not necessary, however, since a flow of the inert gas from aperture 48 which does not have an upward component is also effective to reduce the flow of solids through aperture 38, due to the turbulence generated by the inert fluid in aperture 38. The inert fluid is directed in such a manner that at least a portion of it goes vertically upward in aperture 38. Thus direction of the inert fluid at an angle of from somewhat less than 90° to 180° to the direction of flow of the solids effectively reduces the flow of the solids.

The flow of inert fluid through conduit 50 is varied as desired to obtain various process changes. As the flow of fluid therethrough increases, the flow of solids through aperture 38 decreases, and bed 64 decreases in depth, since the flow of solids through outlet 16 is substantially uniform. Downcomers 60 control the bed depth to some extent, but are not effective directly under the annular curtain of granular solids. The length of time that the liquid hydrocarbon charge is in contact with the solids in the conversion vessel, under conversion conditions, is therefore reduced. Conversely, a decrease in the flow of the inert fluid causes an increase in the flow of solids, an increase in the depth of bed 64, and an increase in the length of time the liquid hydrocarbons are subject to conversion. It is also at times desirable to change the rate of flow of granular solids so as to prevent the formation of a depression in the center of the compact bed, where liquid hydrocarbons might accumulate.

The flow of the inert fluid through conduit 50 may be regulated manually, or may be automatically controlled by various process variables, such as the depth of bed 64, by means well known in the art. In Figure 1 of the drawing, a level control 68 operates control valve 70 to regulate the flow of inert fluid in relation to the level of the bed.

Figure 2:
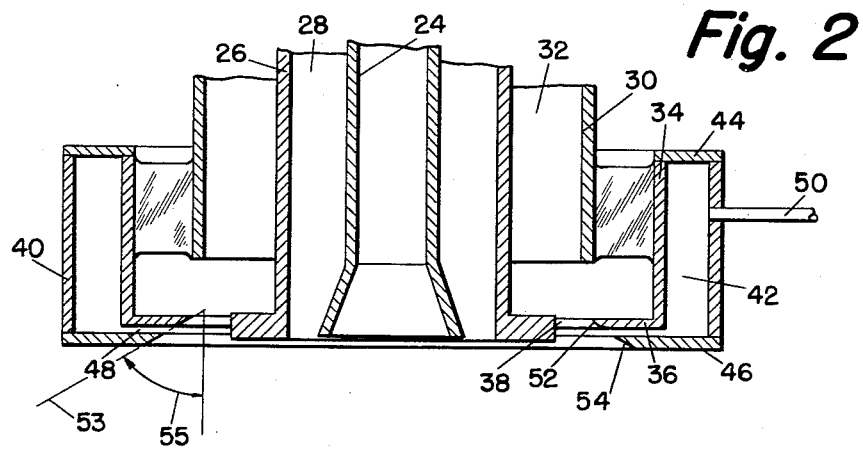
Figure 3:
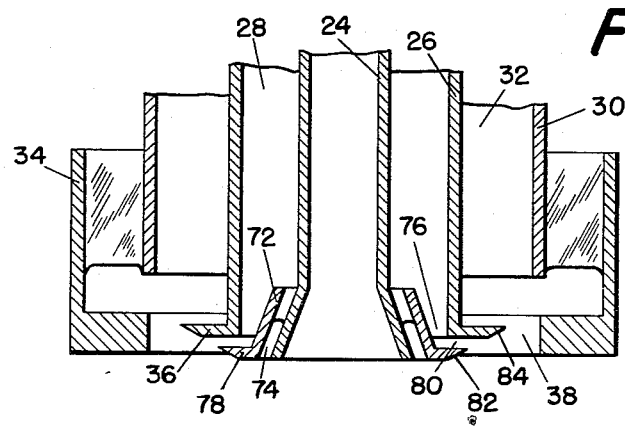
Figure 3 is an enlarged sectional elevational view of a modification of the solids feed controlling means.

In the modification shown in Figure 3, the inert fluid in annular passageway 28 is the fluid used to control the flow of the granular solids. An annular sleeve 72 is spaced away from annular conduit 24, thereby providing an annular passageway 74, which corresponds to annular passageway 62, shown in Figure 1. Sleeve 72 is also spaced away from sleeve 26, providing an additional annular passageway 76. Attached to the lower end of annular sleeve 72 and extending outwardly therefrom is an annular plate 78, which is spaced away from annular closure member 36, so as to form an annular aperture 80 therebetween. Annular plate 78 and closure member 36 are relieved at 82 and 84 respectively similarly as in the modification of Figures 1 and 2.

In this modification a portion of the inert fluid used to protect the metal surfaces from coking is diverted and used to regulate the flow of granular material. Thus the necessity for additional inert fluid line 50 of Figures 1 and 2 is eliminated.

Figure 4:
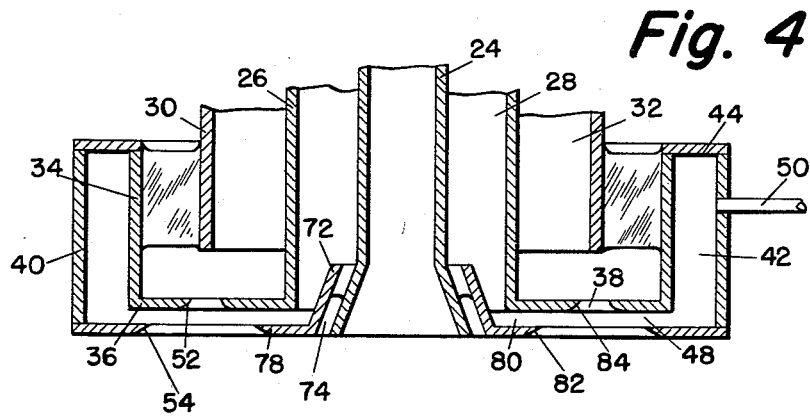
Figure 4 is an enlarged half-section elevational view of another modification of the solids feed controlling means.

In Figure 4 is shown another modification wherein a combination of inert fluid-directing means of Figures 2 and 3 are employed, so that inert fluid is directed countercurrently to the flow of solids from annular apertures on both sides of the annular solids curtain.

The present invention involves passing liquid hydrocarbon downwardly through a central confined zone; passing granular, conversion-supporting solids downwardly as a compact mass through an annulus surrounding at least a portion of the confined zone through which the hydrocarbon is passing, and through an annular constricted zone and therebeneath as a falling annular stream; passing the liquid hydrocarbon downwardly and laterally from the central confined zone into contact under conversion conditions with the falling solids stream; directing a stream of inert fluid into the annular constricted zone through which the granular solids are falling; collecting the granular solids on a gravitating compact bed; and separating solids and fluid conversion products.

In the passage of liquid hydrocarbon charge downwardly through conduit 24, any suitable means can be employed to impart lateral as well as downward movement to the liquid hydrocarbons. For example, in place of the helical baffles 58, a tangential horizontal inlet for the liquid hydrocarbon charge can be used to provide rotary motion, or a conical baffle may be placed beneath the conduit 24 to direct the liquid laterally.

The invention has been described previously with regard to a conversion vessel containing a single assembly for provision of an annular falling curtain of solids and a central stream of liquid hydrocarbon charge. It is to be understood that any suitable number of such assemblies can be employed in a single conversion vessel. Preferably the assemblies are spaced uniformly over the cross section of the vessel, in order that solids and charge from the respective assemblies are distributed over substantially equal portions of the cross-sectional area.

The hydrocarbon charge introduced in liquid phase into the conversion zone can, according to the invention, be introduced in admixture either with vapor phase hydrocarbon charge, or with an inert fluid such as steam. If desired, vapor phase hydrocarbon charge can be separately introduced into the conversion zone. Thus, for example, referring to Figure 1, vapor phase hydrocarbon charge can be introduced through line 66, and passed downwardly through the solids bed 64, the products of conversion of the vapor phase charge being withdrawn through line 22 together with the products of conversion of the liquid phase charge.

If desired, means can be provided to prevent migration of liquid hydrocarbon droplets to the wall of the conversion vessel. Such means are well known in the art, as illustrated for example in United States Patent Number 2,492,998, issued January 3, 1950, to R. C. Lassiat; United States Patent No. 2,492,999, issued January 3, 1950, to R. C. Lassiat; and United States Patent No. 2,493,035, issued January 3, 1950, to R. T. Savage.

It is also within the scope of the invention to provide, if desired, means for directing the annular curtain of falling solids inwardly, as disclosed in United States Patent No. 2,766,187, issued October 9, 1956, to E. V. Bergstrom. It is also within the scope of the invention to provide, if desired, means for providing a plurality of concentric annular falling curtain of solids, as disclosed in United States Patent No. 2,770,583, issued November 13, 1956, to J. H. Haddad.

The present invention is applicable generally to hydrocarbon conversion processes involving contact of liquid hydrocarbon material with granular solid contact material. Cracking, coking, reforming, desulfurization processes, etc., are typical of the types of conversion to which the present invention may be applied. A particularly beneficial application of the invention is in hydrocarbon cracking processes to produce gasoline from higher molecular weight charge stocks. Typical operation in such processes involves introducing heated contact material, at a temperature for example within the approximate range from 800° F. to 1200° F., into a cracking zone, and introducing hydrocarbon charge into the cracking zone at a temperature within the approximate range from 600° F. to 900° F. The contact material withdrawn from the cracking zone is introduced into a regeneration zone, wherein it is contacted with free oxygen-containing gas under conditions suitable for oxidation of carbonaceous materials deposited on the solids during the cracking operation. It is then customary to elevate the solids by suitable known means to a position above the cracking vessel, and gravitate the solids as a compact mass through the cracking vessel again.

Natural or activated clays, bauxite, activated alumina, synthetic silica-alumina catalyst, etc. are examples of catalytic materials to which the invention is applicable. However any of the well known granular conversion catalysts can be employed. Zirkite, mullite, corhart, etc., are examples of refractory heat transfer materials which can be employed as conversion-supporting solid materials according to the invention. However, any of the other well known inert refractory materials for use in hydrocarbon conversion processes can also be employed. The particle size of the granular solid material employed in the process according to the invention is generally within the approximate range from 3 to 20 mesh on the United States sieve series scale.

The invention claimed is:
1. A process for converting hydrocarbons which comprises passing liquid hydrocarbon downwardly through a central confined zone; passing granular, conversion-supporting solids downwardly through an annulus surrounding at least a portion of said confined zone, and therebeneath as a falling annular stream; passing said liquid hydrocarbon downwardly and laterally from the central confined zone into contact under conversion conditions with said falling solids stream; directing at least a portion of a stream of inert fluid vertically upward into the annulus through which the granular solids are falling; collecting the granular solids on a gravitating compact bed; and separating solid and fluid conversion products.

2. In a process as defined by claim 1, the additional step of varying the flow of said inert fluid, whereby the flow of said granular solids is controlled.

3. In a process as defined by claim 1, the additional step of automatically changing the flow of inert fluid in response to a process variable.

4. Apparatus for converting hydrocarbons which comprises a conversion vessel; a central downwardly extending conduit therewithin; means for introducing fluid material into an upper portion of the conduit; means for imparting lateral motion to said fluid material upon leaving said conduit; means providing an annular, downwardly extending conduit for granular solids surrounding the central conduit and having an annular constriction forming an outlet at the lower end thereof; means for directing a stream of an inert fluid upwardly into the outlet, said vessel containing space for lateral movement of an annular stream of solids falling beneath the constriction and space for downward travel of a compact bed of solids beneath the falling stream; and means for separately removing solids and fluid conversion products from the vessel.

5. Apparatus for converting hydrocarbons which comprises a conversion vessel; a central downwardly extending fluid conduit therewithin; a first annular conduit surrounding said central conduit; an outlet at the lower end of said first annular conduit; means for introducing liquid hydrocarbons into the top of said central conduit; means for introducing a solid granular material into the top of said first annular conduit; a second annular conduit surrounding at least a portion of said first annular conduit and extending therebelow; means for introducing an inert fluid into said second annular conduit; means for directing said inert fluid upwardly into the outlet of said first annular conduit; means for imparting lateral movement of said liquid hydrocarbons below said central conduit, said conversion vessel forming an enlarged space below said conduits to allow such lateral movement; a restricted outlet at the lower end of said conversion vessel for the removal of solids therefrom, and separate means for removing conversion products from said conversion vessel.

6. Process according to claim 1 wherein said stream of fluid is directed inwardly toward said annulus.

7. Process according to claim 1 wherein said stream of fluid is directed outwardly toward said annulus.

8. Apparatus according to claim 4 wherein said means for directing are positioned outwardly relative to said outlet.

9. Apparatus according to claim 4 wherein said means for directing are positioned inwardly relative to said outlet.

10. Apparatus according to claim 4 wherein said means for directing are adapted to discharge fluid at an angle within the approximate range from 90 to 180° relative to the direction of flow of solids.

11. Apparatus according to claim 4 wherein said means for directing comprise spaced apart, substantially horizontal plates having edges inclined upwardly toward said outlet.

12. Apparatus according to claim 4 wherein said annular, downwardly extending conduit has a fluid outlet intermediate the ends thereof.

References Cited in the file of this patent
UNITED STATES PATENTS

| | | |
|---|---|---|
| 2,492,999 | Lassiat | Jan. 3, 1950 |
| 2,493,035 | Savage | Jan. 3, 1950 |
| 2,584,378 | Beam | Feb. 5, 1952 |
| 2,726,938 | Lassiat | Dec. 13, 1955 |
| 2,758,067 | Bowles | Aug. 7, 1956 |